United States Patent Office 3,152,084
Patented Oct. 6, 1964

3,152,084
FORMATION OF AMIDE COMPLEXING BEDS
Charles H. Middlebrooks, Creve Coeur, Mo., assignor to Monsanto Company, a corporation of Delaware
No Drawing. Filed Sept. 8, 1961, Ser. No. 136,742
2 Claims. (Cl. 252—184)

This invention relates to an improved process for the preparation of beds of such solid amides as urea which are useful for the separation of organic compounds from mixtures thereof.

Processes for the separation of organic compounds by means of the complex-forming agent urea are well known in the art. These processes permit the seperation of a class of compounds having one type of molecular arrangement from a class of compounds having a different type of molecular arrangement. For example, straight-chain hydrocarbons can be separated, individually or as a class, from branched-chain and/or cyclic hydrocarbons. In such a process, urea is used to form an adduct with the organic compounds having straight carbon atom chains. Urea does not form an adduct with branched-chain compounds. Through the formation of these adducts, separation can be accomplished. Similarly, straight-chain hydrocarbons can readily be separated from cyclic hydrocarbons, such as benzene, toluene, or the cyclo paraffins. In this case, the cyclic hydrocarbons do not form adducts with urea and, consequently, the straight-chain hydrocarbons can be separated by means of the adducts which they form with urea.

While considerable technology has been developed over the past years on the use of urea as a complexing agent for the separation of organic compounds, there is considerable room for improvement, particularly when it comes to the commercial application of such a process. From a commercial standpoint, the most critical aspect of these processes lies in the method used to contact the organic compounds with urea to form the adduct. The fluid processes mentioned in the art require expensive and extensive purification and recovery techniques. The moving-bed processes frequently result in plugging of the equipment.

Of recent date, there has been developed a technique for contacting the mixture of organic chemicals to be separated with urea dispersed throughout an inert solid carrier. The carrier may be a solid granular material such as earth, clay, silica gel, fuller's earth, bauxite, kieselguhr, sand, etc., as disclosed in U.S. Patent 2,676,141, or, and preferably, an inert, non-porous, non-absorptive, fibrous carrier as discolsed in co-pending application Serial No. 90,221, filed February 20, 1961. A significant degree of the commercial success of these processes has been found to depend upon the method used for preparing the bed of urea dispersed throughout the solid carrier.

It is now the object of the present invention to provide an improved process for the preparation of a bed of solid urea dispersed throughout an inert carrier, useful in the resolution of a mixture of organic compounds. More particularly, the object of the present invention is to provide an improvement in the process of impregnating an inert carrier with urea whereby a high efficiency in the loading of the carrier with urea is attained. Further objects will become apparent from the following description of the invention herein disclosed.

In fulfillment of these and other objects, it has now been found that beds of solid urea dispersed throughout a solid carrier and possessing superior resolving powers for mixtures of organic compounds may be prepared by totally immersing said solid carrier in a heated aqueous saturated solution of urea, substantially cooling the solution to precipitate the urea from the solution, draining the water from the impregnated solid carrier and then washing the impregnated solid carrier with a liquid in which water is highly soluble but in which the urea is either totally insoluble or at least only sparingly soluble and which has a relatively low vapor pressure. This method of preparing beds of urea impregnated solid inert carriers has the advantage of allowing the use of water as a solvent for urea which, in turn, allows the deposition of great quantities of the urea on the carrier than may be attained from using the other solvents which are commonly used for preparing impregnating solutions. Further, the present invention provides for the removal of residual water without resorting to heating, vacuum, air or other gas purges, etc., and simultaneously may place an activator in contact with the urea deposited on the carrier. Activators are such compounds as alcohols and other oxygenated organic compounds which act as catalysts in the adduction of the hydrocarbons with urea.

The process of the present invention results in the deposition of greater quantities of urea on solid inert carrier beds under less extreme conditions and allows the use of less expensive and easier handled solvents than the conventional prior known methods. The following examples are descriptive and illustrative of the present invention. These examples not, however, to be construed as limiting in any manner the present invention.

Example I

A mixture of 528 grams of water and 857 grams of urea were heated to 80° C. and the resulting solution poured over a bed of 95 grams of a fiber glass carrier contained in a 2-inch diameter glass pipe. The solution was allowed to cool to 23° C., thereby causing the precipitation of urea. The excess urea solution was then drained off. Approximately 500 ml. of isopropanol were then percolated through the bed to remove the residual water. The precipitated urea was uniformly dispersed throughout the bed. The bed contained 279 grams of urea and had a composition of 74.6 weight percent urea and 25.4 weight percent carrier.

Caustic-washed refinery kerosene (150 grams) having a refractive index at 20° C. of 1.4499 and a boiling range of 165–275° C. containing 25 ml. of isopropanol and 1 ml. of water as developer were passed through the bed at 25° C.

Commercial hexane (500 ml.) was percolated through the bed at room temperature to remove unreacted kerosene. The adduct was dissociated with isooctane at 80° C. Subsequent removal of isooctane from the n-alkanes yielded 25.5 grams of paraffin concentrate with a refractive index at 20° C. of 1.4258. Infrared analysis indicated the paraffin concentrate to contain greater than 90 percent n-paraffins. The yield was equivalent to 17.0 weight percent of the kerosene charged.

Example II

A glass pipe of 2-inch diameter and containing 95 grams of the same fiber glass as used in Example I was prepared. A methanol-urea solution was then prepared by placing 437 grams of urea in 678 grams of methanol and heating to 75° C. under a pressure of 20 p.s.i.g. The 2-inch glass column was pressured to 20 p.s.i.g. with nitrogen and the methanol-urea solution introduced. The column was cooled to 30° C. and the pressure reduced to atmospheric. The urea-impregnated fiber glass bed was then drained and dried by passing nitrogen through the column. The amount of urea deposited in this manner was 281 grams which represents 75 weight percent of the urea bed with the remainder being the fiber glass.

It is noted that the urea loading of the inert carrier is approximately equivalent in Examples I and II. However, the purpose of introducing Example II is to show the rather drastic and extreme conditions necessary to attain this loading using a solvent for urea other than water. The amount of urea on the carrier is, of course, determinative of the amount of material which will be separated from an organic mixture by adduction. Thus, it is readily apparent that a maximum effective loading of the inert carrier be attained and that it be attained by the simplest and most inexpensive methods possible. From the Examples I and II, it is apparent that the present invention accomplishes these ends.

Any inert solid carrier can be used in the practice of this invention although the inert, non-porous, non-absorptive, fibrous carriers are preferred. Carriers applicable include earth, clay, silica gel, fuller's earth, bauxite, kieselguhr, sand, vermiculite, fiber glass, asbestos fibers, fibrous insulating aluminum silicate, etc.

The solvent for the urea according to the present invention is water. For maximum solubility to attain the optimum loading of an inert carrier, the aqueous solution of urea will most generally be prepared at temperatures of 70 to 95° C. The use of pressure is, of course, unnecessary. To bring about precipitation of the urea from the aqueous solution, the temperature is generally lowered to approximately 20 to 25° C. The amount of urea which may be expected to dissolve in a given quantity of water at a particular temperature may be readily ascertained from solubility tables found in "Solubilities of Organic Compounds" by Seidell.

The amount of urea placed on an inert carrier for maximum adduction efficiency will vary somewhat with the type of carrier used, the organic compound to be adducted with the urea, as well as such other operating variables as temperature, pressure, activator, method of contact, etc. However, regardless of the amount of urea to be placed on the inert carrier, it may generally be placed on the carrier more easily and efficiently according to the process of the present invention.

The compounds which are used to remove the water have three characteristics. They must have high solubility for water. Secondly, these compounds must have little or no solubility for urea at the temperatures at which they are used. A third characteristic is that they possess a relatively low vapor pressure in order that any excess amount of these compounds may be readily removed from the impregnated bed. Another very desirable characteristic of these compounds is that they be activators or catalysts for the adduction reaction. Several non-limiting examples of compounds which possess the above characteristics are methanol, ethanol, isopropanol, propanol, the lower ketones, etc. The preferred of these compounds is isopropanol.

The amide beds prepared by the process of this invention are used to resolve mixtures of organic compounds by adduction of a portion of the organic compounds contained therein.

The organic compounds that form adducts with urea are many and varied. It has been found that a straight-chain organic compound having a straight aliphatic carbon atom chain containing from six to 50 carbon atoms therein will form adducts with urea in preference to branched-chain or cyclic organic compounds. The straight-chain organic compounds can be unsubstituted hydrocarbons as well as hydrocarbons containing substituent groups attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, pentadecane, hexadecane, heptadecane, nonadecane, eicosane, heneicosane, docosane, and progressively higher molecular weight straight-chain paraffins up to and including pentacontane; and the straight-chain olefins containing from six to fifty carbon atoms, for example, the hexenes, heptenes, octenes, nonenes, decenes, undecenes, dodecenes, tridecenes, tetradecenes, pentadecenes, hexadecenes, heptadecenes, nonadecenes, eiconsenes, heneicosenes, docosenes, and progressively higher molecular weight straight-chain olefins up to and including the pentacontenes, form adducts with urea and, accordingly, they can be readily separated from branched-chain or cyclic hydrocarbons that do not form adducts with urea. Similarly, the corresponding diolefinic hydrocarbons of the above-named compounds form adducts with urea provided the hydrocarbons contain an unbranched chain of from six to fifty carbon atoms. Additionally, many derivatives of these saturated and unsaturated hydrocarbons form adducts with urea. For example, hydroxy, amino mercaptan, and halide derivatives of these hydrocarbons form adducts with urea. Also, various ketone and ester derivatives of these hydrocarbons react similarly. Ordinarily, the various substituent groups set forth above are attached to one of the two end carbon atoms in the unbranched carbon chain of six to fifty carbon atoms. However, when fluoride atoms are attached to the carbon chain, they act similar to hydrogen atoms and when attached to any of the carbon atoms in the unbranched chain, they do not inhibit the formation of adducts with urea. The primary characteristic of these organic compounds is the unbranched chain of from six to fifty carbon atoms.

The urea adducts that are formed contain more than three mols of urea per mol of organic compound. Thus, determination of the amount of urea to be used for separation of the adductable organic compounds from any particular mixture is easily within the ability of anyone skilled in the art.

The adducts of the urea and the organic compounds disclosed above are formed at a temperature below the decomposition temperature of the adducts. In general, this temperature is below 175° F., and room temperature, about 60 to 80° F., is preferred.

The use of activators or catalysts in the adduction of organic compounds with urea is generally recognized as very desirable. Most of the compounds usually classed as activators are relatively good solvents for water and these may be used to remove the residual water from the impreganted carrier in accordance with the present invention. In many instances, therefore, it will not be necessary to add additional activator to the adduction system. If additional activator is desired, however, it may be added prior to or concurrently with the organic material to be resolved by adduction. Suitable activators are small amounts of water, methanol, ethanol, propanol, secondary butyl alcohol, and various ketones.

After the adduction step is complete, the unadducted material is washed from the urea bed by means of a hydrocarbon which is a non-solvent for the urea in the adduction step. Following this, the adducts are decomposed to recover the adducted organic material.

It has been found preferable to decompose the adducts formed by contacting the adducts with a hydrocarbon at an elevated temperature suitable for decomposing the adducts. The hydrocarbon employed should not form an adduct with the urea at the conditions prevailing in the bed. To decompose adducts of urea and straight-chain organic compounds, straight-chain hydrocarbons may be employed provided the decomposition temperature of the adducts of these hydrocarbons and urea is below the temperature in the bed. For example, n-hexane can be used to decompose adducts of urea and higher boiling hydrocarbons, such as n-octane, n-nonane, n-decane, and the like, if the temperature in the bed is at least as high as the decomposition temperature of the adducts of urea and n-hexane. Similarly, low-boiling straight-chain hydrocarbons such as propane, butane, and mixtures thereof can be used since these hydrocarbons do not form adducts with urea. Also, isoparaffinic hydrocarbons are suitable for the decomposition of urea adducts. Also, if desired, cycloparaffinic hydrocarbons such as cyclopentane, cyclo-hexane, and the like, can be employed to decompose urea adducts.

The hydrocarbons employed to dissociate adducts of urea and organic compounds should be readily separable by fractional distillation and differing boiling points are therefore required between the liquid hydrocarbon employed and the organic compound of the adduct. For that reason, it is usually desirable to employ relatively low-boiling hydrocarbons such as pentane, butane, propane, and the like, to effect the decomposition since these hydrocarbons are readily separable from the organic compound of the adduct after the adduct has been decomposed.

It has been found particularly suitable to effect the decomposition of the adduct by passing the hydrocarbon utilized for the decomposition downwardly in the vapor state through the bed of the adduct. The hydrocarbon and the organic compound from the adduct are condensed and withdrawn from the bottom portion of the column, recovered and then separated by distillation. The decomposition of the adduct is effected at a temperature above the temperature of the adduct-forming reaction. The decomposition temperature employed is dependent upon the organic compound in the adduct since, in general, the adduct decomposition temperature is dependent upon the number of carbon atoms in or the molecular weight of the organic compound in the adduct. For all practical purposes, temperatures within the range of 120° to 260° F. are suitable for the decomposition of the adduct.

This application is a continuation-in-part of application Serial No. 722,139, filed March 18, 1958, abandoned September 25, 1961.

What is claimed is:

1. In a method of preparing a bed of an inert solid carrier having dispersed therethrough solid urea, the improvement which comprises immersing said inert solid carrier in a heated aqueous saturated solution of said urea, substantially cooling the solution to precipitate the urea from the solution, removing water and excess urea and then washing the impregnated inert solid carrier with a liquid in which water is highly soluble but in which the urea is very sparingly soluble and which liquid has a relatively low vapor pressure, said liquid being selected from the group consisting of methanol, ethanol, propanol and isopropanol.

2. The method of claim 1 wherein the wash liquid is isopropanol.

References Cited in the file of this patent
UNITED STATES PATENTS

| | | |
|---|---|---|
| 2,676,141 | Kane et al. | Apr. 20, 1954 |
| 2,716,113 | Axe | Aug. 23, 1955 |
| 2,731,391 | Salzmann | Jan. 17, 1956 |
| 2,912,426 | Karr | Nov. 10, 1959 |